US006715671B2

(12) United States Patent
Abe et al.

(10) Patent No.: US 6,715,671 B2
(45) Date of Patent: Apr. 6, 2004

(54) AUTOMATIC BILL DISPENSING APPARATUS WITH A SORTING DEVICE

(75) Inventors: Hiroshi Abe, Iwatsuki (JP); Joji Iida, Hachioji (JP)

(73) Assignee: Asahi Seiko Co., Ltd., Tokyo (JP)

( * ) Notice: Subject to any disclaimer, the term of this patent is extended or adjusted under 35 U.S.C. 154(b) by 0 days.

(21) Appl. No.: 10/254,212

(22) Filed: Sep. 25, 2002

(65) Prior Publication Data

US 2003/0075487 A1 Apr. 24, 2003

(30) Foreign Application Priority Data

Sep. 26, 2001 (JP) ....................................... 2001-294979

(51) Int. Cl.[7] ................................................ G06F 17/60
(52) U.S. Cl. ....................................... 235/379; 235/382
(58) Field of Search ................................ 235/379, 382, 235/385, 440; 902/13, 14; 209/534, 552

(56) References Cited

U.S. PATENT DOCUMENTS 4,236,639 A * 12/1980 Boettge et al. ............. 209/534
4,625,870 A 12/1986 Nao et al. ................... 235/379
4,795,889 A 1/1989 Matuura et al. ............ 235/379
4,972,958 A * 11/1990 Ito et al. ...................... 235/379
5,553,320 A 9/1996 Matsuura et al. ........... 235/379
5,626,822 A * 5/1997 Kadowaki et al. .......... 235/379
6,189,881 B1 * 2/2001 Bolton et al. .............. 271/9.04

* cited by examiner

*Primary Examiner*—Daniel St.Cyr

(57) ABSTRACT

An efficient and relatively easily manufactured sorting device for separating duplicated banknotes includes a resistant guide unit for initially contacting the banknotes and a rotatable driving unit having a higher friction surface that is positioned downstream of the resistant guide unit for subsequently pulling the banknote from the resistance guide unit whereby a duplicated banknote will be separated. The sorting device can be installed in a dispensing device for storing banknotes and can be positioned in a recycle passageway wherein banknotes can be aligned by an arraying device prior to submission to the sorting device. The resistance guide unit can include a pair of eccentrically mounted fixed curved surface members. A second rotatable roller can be in contact with the rotatable driving roller to form a nipping section downstream of the initial banknote contact with the resistance guide unit.

16 Claims, 8 Drawing Sheets

PRIOR ART

PRIOR ART

AUTOMATIC BILL DISPENSING APPARATUS WITH A SORTING DEVICE

BACKGROUND OF THE INVENTION

1. Field of the Invention

The present invention is directed to an improvement in automatic dispensing of stored bills, and more particularly the dispensing of only one bill at a time from a stack of bills with the assistance of a sorting device.

2. Background of the Invention

Examples of various forms of bill dispensing devices can be found, such as in U.S. Pat. Nos. 4,625,870, 4,795,889, and 5,553,320.

A compact banknote dispensing device is shown in the Japanese Laid-Open Patent Application No. 54-49475. FIGS. 7 and 8 disclose features relevant to that reference. Referring to FIGS. 7 and 8, a stack of bills, such as banknotes B, can be supported at a dispensing station or base 505, and a mechanism can be used to bias the banknotes B for contact with a rotatable pickup roller 501. The banknote B is then directed to a feed roller 503 that can have a central groove 502. Fixed gate rollers 504 are positioned to be aligned within the concave grooves 502. When the banknote B is dispensed, the pickup roller 501 and the feed roller 503 cooperate to direct the banknote B in a counterclockwise direction, as shown in FIG. 7. The banknote B is drawn downward and is transported by the feed roller 503. A front surface of the banknote B is drawn by the feed roller 503, however, the rear surface is faced with a breaking action by the fixed gate rollers 504. The banknote B is dispensed by the feed roller 503. If accidentally, a pair of banknotes B are simultaneously released from the base of 505, the front banknote B which has contact with the feed roller 503 will be dispensed. However, the rear banknote which is in contact with the fixed gate roller 504 will be braked and held back so that only one banknote is dispensed.

This problem of duplication of banknotes sometime occurs, because banknotes B are forcibly transported between the feed roller 503 and the fixed gate roller 504. In order to increase the braking forces, the fixed gate roller 504 is located deep within the position of the concave groove 502 to prevent a dispensing of duplicate banknotes. In this arrangement, the friction which is produced from the fixed gate roller 504 on the banknote B becomes larger and helps to prevent the dispensing of a duplicate banknote B. A problem can occur, however, since a precise precision alignment and adjustment of the fixed gate rollers 504 can become difficult and requires substantial service time. Additionally, when the friction increases, the transporting speed of the banknote B will be correspondingly slowed down.

Thus, the prior art is still seeking to optimize a fast and efficient dispensing of banknotes while preventing erroneous duplication of banknotes in the dispensing operation.

SUMMARY OF THE INVENTION

The present invention is directed to a more efficient manner of separating stacked bills, and more particularly provides an apparatus for properly aligning bills and sorting duplicated bills that have been dispensed from a stack of bills.

A dispensing device for storing banknotes in a storage unit and for dispensing banknotes to a user through a discharge slot is provided with a transporting unit for transporting a banknote to be discharged from the stack of banknotes along a first passageway to a discharge slot. A monitor unit can be operatively positioned relative to the first passageway to monitor a condition of the transported banknote and to provide appropriate control signals. A diverting unit operatively connected to the monitoring unit can remove banknotes from the first passageway when the monitoring unit indicates at least a duplicated banknote has passed the monitoring unit. A second passageway can recycle the duplicated banknotes to a sorting device that can include a resistance guide unit to initially contact the duplicated banknotes and direct them to a rotatable driving roller having a higher friction surface that subsequently contacts the duplicated banknote to provide a separation of the duplicated banknotes. The resistance guide unit can be a pair of curved surfaces that sandwich the rotatable driving roller and can be eccentrically mounted on the same axis as the rotatable driving roller. The resistance guide unit can comprise larger diameter rollers that can be adjustably fixed about the rotatable driving roller. A second movable roller can contact the surface of the rotatable driving roller to form a nipping section which is downstream from the initial contact of the duplicate banknotes with the resistance guide unit.

An arraying device can bias a banknote for contact with a rotatable flexible roller that is driven through a friction clutch. The friction clutch is set to prevent any damage to the banknotes, while the flexible roller has a slanting surface to assist in directing and aligning the banknotes prior to introduction of the banknotes to the sorting device.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENT

The following description is provided to enable any person skilled in the art to make and user the invention and sets forth the best modes contemplated by the inventors of carrying out their invention. Various modifications, however, will remain readily apparent to those skilled in the art, since the general principles of the present invention have been defined herein specifically to provide an automatic bill dispensing apparatus with a sorting device.

Figure 1:
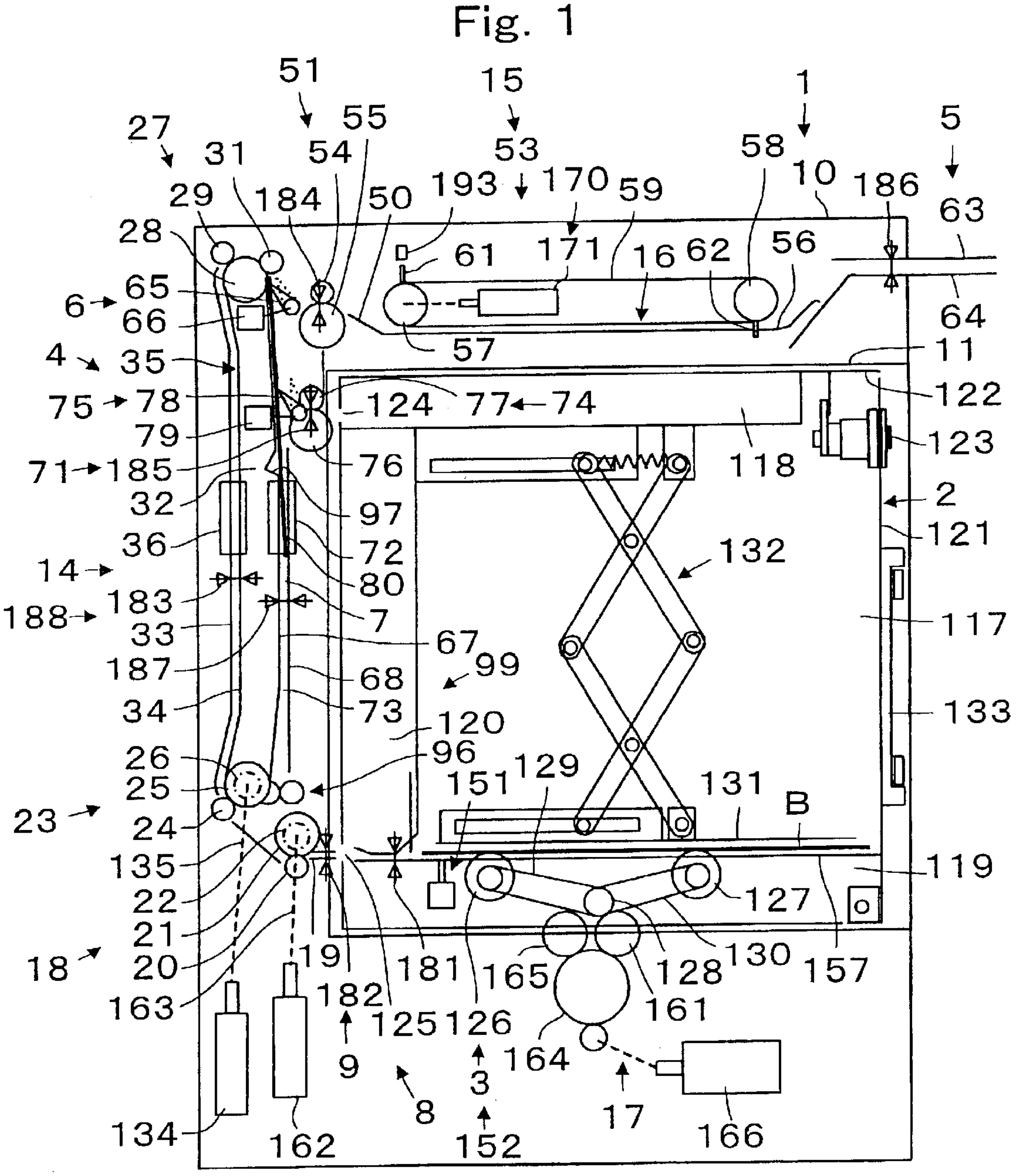
FIG. 1 is a schematic cross-sectional view of a banknote dispensing device of the present invention.

An embodiment of the banknote dispensing device which is attached to a sheet dispensing device of the present invention is explained by referring to FIG. 1. The banknote dispensing device 1 includes a safe 2, a let off device 3, a transporting device 4, a banknote dispensing slot 5, a diverting device 6, a recycling passageway 7, a recycling device 8, and a checking device 9.

As can be appreciated, the term "bill" or "banknote" has been used generically to define a flat sheet usually of paper or a composite material which can be stacked in an array for storage and dispensed, for example, from a cash dispensing machine. Thus, the term "bill" or "banknote" can embrace a sheet, check, certificate, coupon ticket, exchange ticket, or various types of monetary instruments.

Safe 2 is box-like in shape and is arranged in a storing section 11 of the dispensing body 10. A transporting device 4 transports a banknote B which is let off from safe 2 to a banknote dispensing slot 5 in response to a dispensing signal and includes a first transporting device 14 which is located along one side of storing section 11 and a second transporting device 15 which is located over the storing section 11.

The first transporting device 14 transports a banknote B in a vertical direction. A storing device 16 can temporarily store a banknote B which is received from the first transporting device 14 in a horizontal level section adjacent the dispensing slot 5. A recycling passageway 7 is located between the storing section 11 and the first transporting device 14, and extends parallel to the first transporting device 14 which is vertically aligned on one side of the dispensing device.

A diverting device 6 is located between the first transporting device 14 and the second transporting device 15 and can divert banknotes B to one of the second transporting device 15 or to the recycling passageway 7. Let off device 3 for the banknotes B is located at the bottom of safe 2 and is driven by driving device 17 which is located in body 10.

First transporting device 14 includes a first transporting roller 18 which is located adjacent to a receiving slot 19 beside storing section 11. First press roller 20 of first transporting roller 18 has a small diameter and is resiliently pressed against the first roller 21 which has a larger diameter. First gear 22 is fixed at a side surface of first roller 21.

Second transporting roller 23 is located above first transporting roller 18 on one side. Second press roller 24 of second transporting roller 23 has a resiliently contact with second roller 25. Second gear 26 is fixed at the side surface of second roller 25.

Third transporting roller 27 is located over the second transporting roller 23 and is located above the storing section 11. Third transporting roller 27 includes a third roller 28 which has a large diameter, a third press roller 29 which has contact with the upper section of the center of third roller 28 and a fourth press roller 31.

First guiding board 32 is located between second roller 25 and third roller 28. Second guide board 33 is plate like in shape and is located at a predetermined position which is away from the first guiding board surface 34. First transporting passageway 35 extends between first guide board surface 34 and second guiding board 33.

First arraying device 36 is located at a middle section of first transporting passageway 35. First arraying device 36 has the function of ensuring that a banknote B which is transported by first transporting device 14 is guided to the reference plane.

Second transporting device 15 includes a fourth transporting roller 51, storing device 16 and package of banknotes dispensing device 53. Fourth transporting roller 51 is located above the storing section 11 and to the right of the first transporting device 14 in FIG. 1. Fifth press roller 54 of fourth transporting roller 51 has a resiliently contact with fourth roller 55.

Next storing device 16 which is adjacent the dispensing slot is explained.

Tray 50 is located above the storing section 11 and on the right of fourth transporting roller 51 in FIG. 1. Tray 50 is dish-like in shape and has a concave portion 56 at the center. The length of concave 56 is slightly longer than banknote B. Banknote B is temporarily stored at concave portion 56 before being dispensed to the user.

Next package dispensing device 53 is explained. A pair of guiding rollers 57 and 58 are located over and away from tray 50. First belt 59 is positioned around guide rollers 57 and 58.

First projection 61 and second projection 62 are fixed at the outer surface of first belt 59 to contact and move the banknotes B that accumulate in the tray 50. The distance between projections 61 and 62 is the same, which is longer than the length of a banknote B. The lower surface of first belt 59 is parallel to concave portion 56 of tray 50.

Next, banknote dispensing slot 5 is explained. Guiding boards 63 and 64 are located over storing section 11 and are at the right side of second transporting device 15. They are positioned at a predetermined distance. The left ends of guiding boards 63, 64 are V shaped.

Next, diverting device 6 is explained. Diverting device 6 is located between third transporting roller 27 and fourth transporting roller 51 and includes diverting board 65 and a first solenoid 66 which rotates the diverting board 65. When the first solenoid 66 is demagnetized, banknotes B are guided to recycling passageway 7 by the diverting board 65. On the other hand, when the first solenoid 66 is excited, banknotes B are guided to fourth transporting roller 51.

Next, the recycling passageway 7 is explained. The recycling passage 7 includes a first guiding board reverse side 67 and a third guiding board 68 which is located at a predetermined distance away from the reverse side 67. Recycling passageway 7 is located between first transporting device 14 and storing section 11 and is approximately vertical. Rejecting device 71, second arraying device 72, recycle storing device 73 and recycling device 8 are located at recycling passageway 7 and are arrayed downwards.

Next, the rejecting device 71 is explained. The rejecting device 71 includes a reject transporting roller 74 and a reject diverting device 75.

The reject transporting roller 74 is located between the upper section of the storing section 11 and the first transporting device 14. Reject transporting roller 74 includes a sixth pressing roller 77 which has a small diameter and has resilient contact with the fifth roller 76 which has a large diameter.

Next, reject diverting device 75 includes a reject guiding board 78 and a second solenoid 79. The reject guiding board 78 is located between the first guiding board 32 and the reject transporting roller 74. Recycling banknotes 80 are guided to the reject transporting roller 74 or the recycle storing device 73 by the reject guiding board 78.

When the second solenoid 79 is unexcited, the reject guiding board 78 is located at the first guiding board 32 side. Therefore, a recycling banknote 80 is guided to the reject transport roller 74. When the second solenoid 79 is excited, the reject guiding board 78 moves. Therefore, the recycling banknote 80 is guided to the recycling storing device 73.

Figure 2:
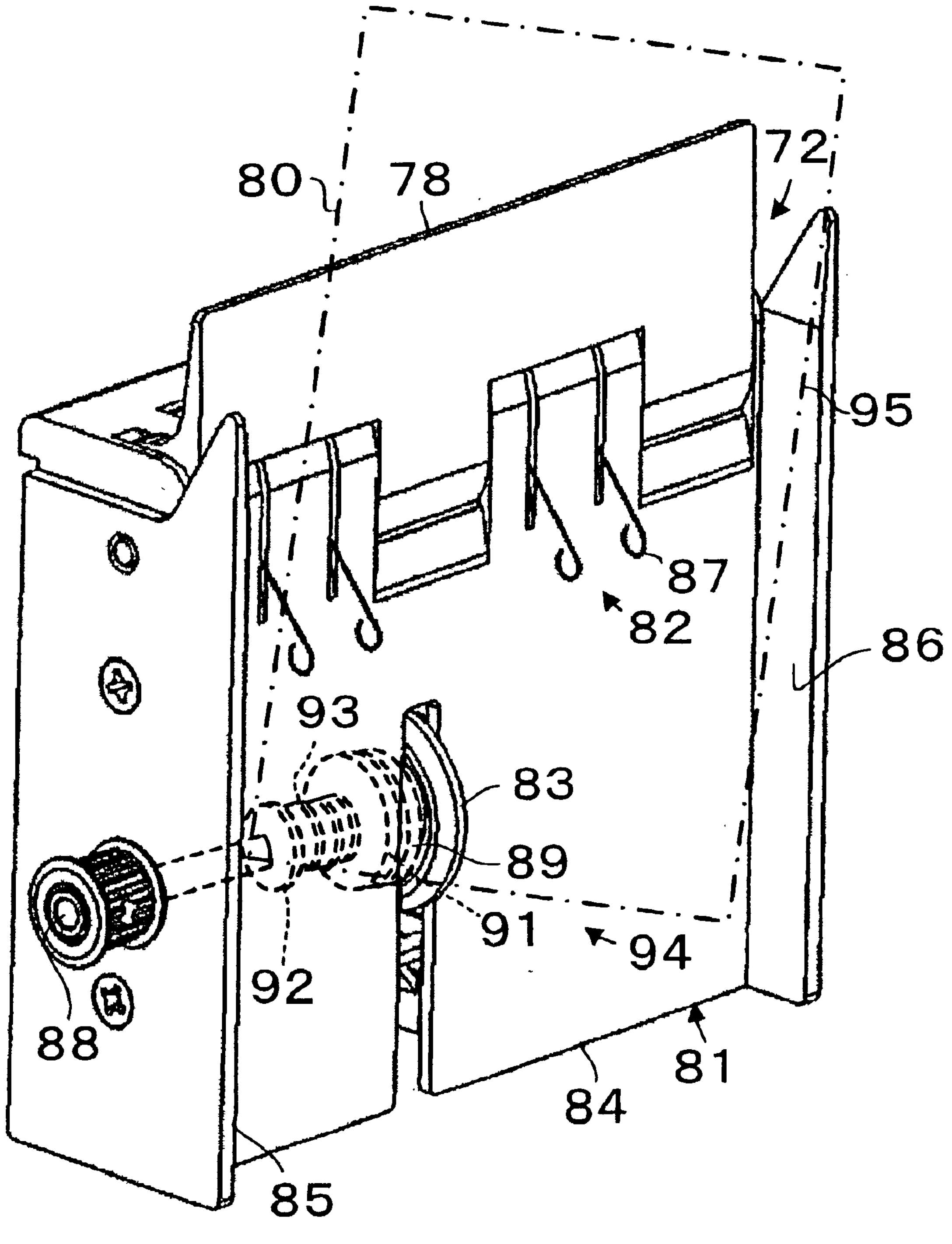
FIG. 2 is a perspective view of a second arraying device.
Figure 3:
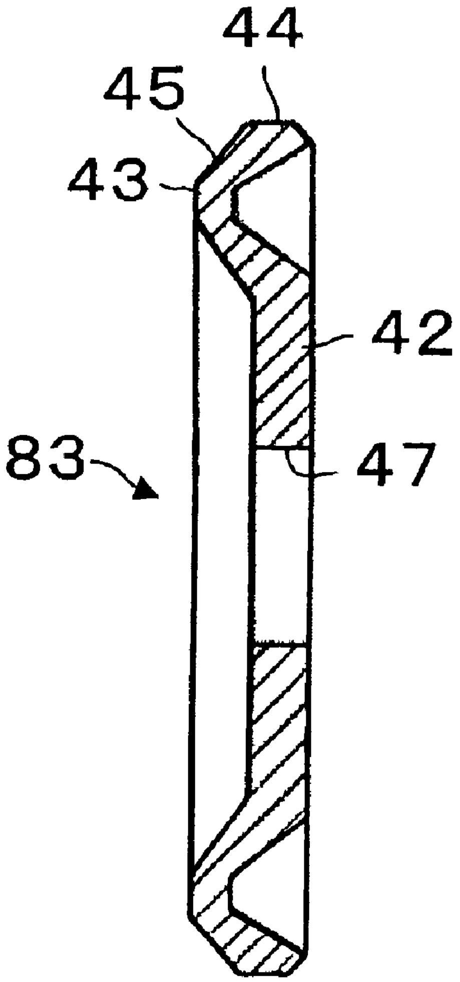
FIG. 3 is a cross-sectional view of the second arraying roller.

The second arraying device 72 is explained by referring to FIG. 2 and FIG. 3. Second arraying device 72 arrays the recycled banknote 80 along a wall.

Second arraying device 72 is located near the downstream side of the reject transporting roller 74. The reject guiding board 78 is mounted at the upper section of a body 81 of the second arraying device 72 and is rotatable.

The second arraying device 72 includes a bias device 82, a second arraying roller 83, a first guiding wall 84, a second guiding wall 85, and a third guiding wall 86. A tunnel-like shape is made up from first the guiding board reverse side 67, the first guiding wall 84, the second guiding wall 85, and the third guiding wall 86 for transporting banknotes. The tunnel is a part of the recycling passage 7.

As shown in FIG. 2, the bias device 82 is made up from a spring wire. A loop at the end of the bias device 82 is known as wire spring bail 87 and its base is fixed at body 81. The top of wire spring 87 is located in the recycling passage 7. Therefore, the wire springs 87 can be four in numbers, and they are located at predetermined distances and are parallel to each other. The second arraying roller 83 is located downstream of the bias device 82 and is in the shape shown in FIG. 3. The second arraying roller 83 is shown in FIG. 3.

The second arraying roller 83 has a circular plane section 42 and a V cross-section 43 which is located around the circular plane section 42. The V cross-section 43 has a cylindrical section 44 which is parallel to a rotating axis and a slanting section 45. Second arraying roller 83 can be made from polyurethane and has a certain degree of elasticity and is fixed at a rotating shaft 88 which penetrates through supporting hole 47.

A timing pulley is fixed at the end of rotating shaft 88. The timing pulley is driven through a belt (not shown) by a driving source. Second arraying roller 83 is pressed to first guiding board 34. Therefore, the cylindrical section 44 and slanting section 45 are transformed and have contact with banknotes B.

The peripheral speed of the cylindrical section 44 is larger than the speed of slanting section 45 to transform the second arraying roller 83. Therefore, the lower edge of banknote B is pressed to third guide wall 86 because banknote B pivots in the clockwise direction as shown in FIG. 2. Next, the side edge 95 of banknote B has contact with third guide wall 86, as a result, it is arrayed along the third guide wall 86.

Friction disc 89 is fixed on the second arraying roller 83. Second friction disc 91 is located adjacent to the friction disc 89 and is rotatable on the rotating shaft 88. Second friction disc 91 is pushed toward the friction disc 89 by spring 93 which is located between a stopper 92 which is fixed on a rotating shaft 88 and the friction disc 89. Friction clutch 94 includes the friction disc 89 and the second friction disc 91.

The recycling banknotes 80 are transported downwards and are pushed to the first guiding wall 84 and reverse surface 67 by the wire spring 87 at the second arraying device 72. The side edge 95 of the recycling banknotes 80 are pushed to the third guiding wall 86 by the second arraying roller 83, one by one by the dispensing device 96, and as a result, they get transported.

When recycling banknote 80 is stopped by the one by one dispensing device 96, the recycling banknote 80 has contact with the second arraying roller 83. In this situation, recycling banknote 80 is stalled, because when the friction force between the second arraying roller 83 and the recycling banknote 80 is over a predetermined force, the friction clutch 94 slips, and as a result, the second arraying roller 83 does not slip relative to the recycling banknote 80.

Slanting surface 97 is hollow and is located at a first guide board reverse surface 67 (shown in FIG. 1). Recycling banknotes 80 are guided to the base of a spring by a slanting surface 97.

Next, the recycling device 8 is explained. The recycling device 8 includes the one by one dispensing device or sorting device 96 and a receiving unit 99. The sorting device 96 is explained by referring to FIGS. 4 and 5. The one by one dispensing device 96 is located below the recycling passage 7.

It includes a roller 101 which is fixed on a shaft 100, a seventh pressing roller 102 which has contact with the roller 101 and fixed rollers 103 and 104 which have larger diameters than roller 101. Seventh pressing roller 102 is rotatable and is supported on shaft 105. Fixed rollers 103 and 104 are provided as a resistance guide.

The shape of the resistance guide unit can be made up of semicircles or shafts, because it can give resistance to the recycling banknote 80. When the resistance guide has a circular configuration, the duplication between the seventh pressing roller 102 and the resistance guide can be changed, because the resistance guide unit can be rotated on the shaft 100. As a result, the resistance can be changed for the recycling banknote 80.

The surface of the seventh pressing roller 102 has a relatively high friction. The seventh pressing roller 102 can be made from EPDM. When the seventh pressing roller 102 is made up as a roller, it can be inexpensive to design. The seventh pressing roller 102 can be made up of metal and the surface can be satin finished.

Fixed roller 103 is fixed on stay 106, and fixed roller 104 is fixed on stay 107. Fixed rollers 103 and 104 are eccentrically positioned relative to shaft 100 and can be changed to a rotating position (the dotted line shown in FIG. 5). Fixed rollers 103 and 104 are made from a hard polyurethane rubber. The hard polyurethane rubber has a long life, a high friction coefficient, and is inexpensive. Alternatively, fixed roller 103 and 104 can be made up of a metal with a high friction surface.

The fixed rollers 103, 104, and the seventh pressing roller 102 make up the overlap section 108 having a side cross-sectional wedge shape receiving section for the banknotes. The banknote receiving section 109 is located over the overlap section 108 and has a wedge-like opening shape for receiving the entrance edge of the banknotes The fixed rollers 103 and 104 are fixed on stays 106 and 107 by screws 110 and 111 and can be adjusted.

The fixed rollers 103 and 104 can be changed in their position on stay 106 and 107, by adjustment with the screws. Screws 110 and 111 can be loosened and can let the rollers be rotated. Therefore, any duplication of banknotes between the fixed rollers 103 and 104 and the seventh pressing roller 102 can be changed. The seventh pressing roller 102 is rotatable on shaft 105.

Figure 4:
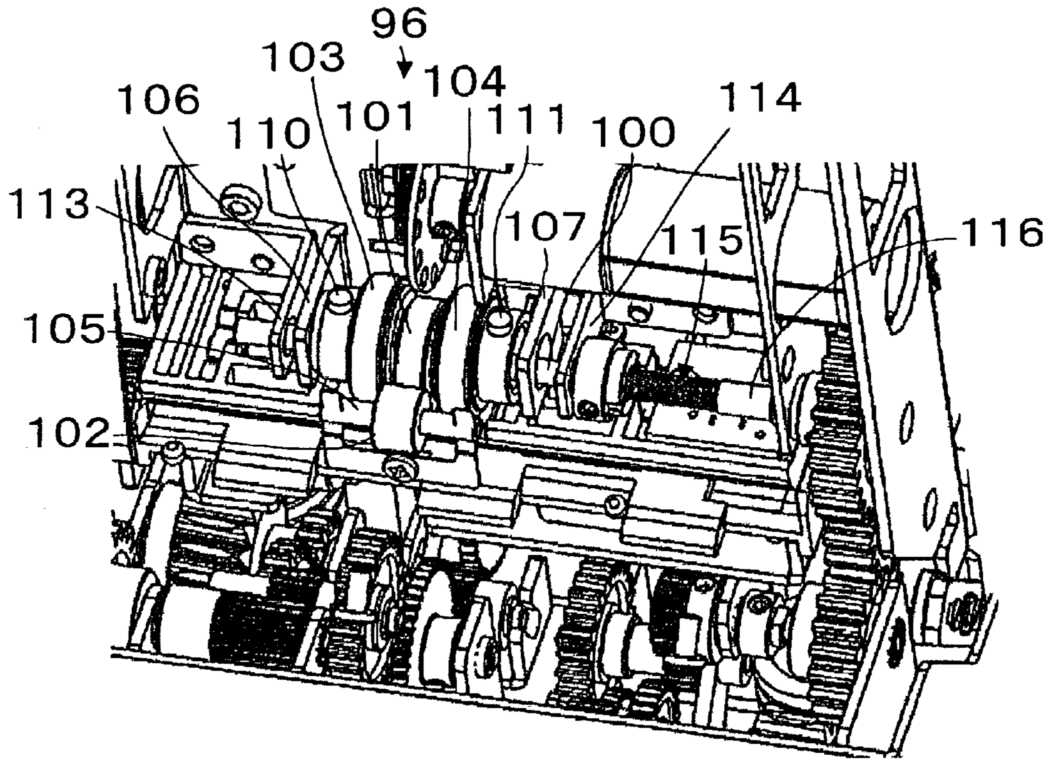
FIG. 4 is a partial perspective view of a one by one let off device.
Figure 5:
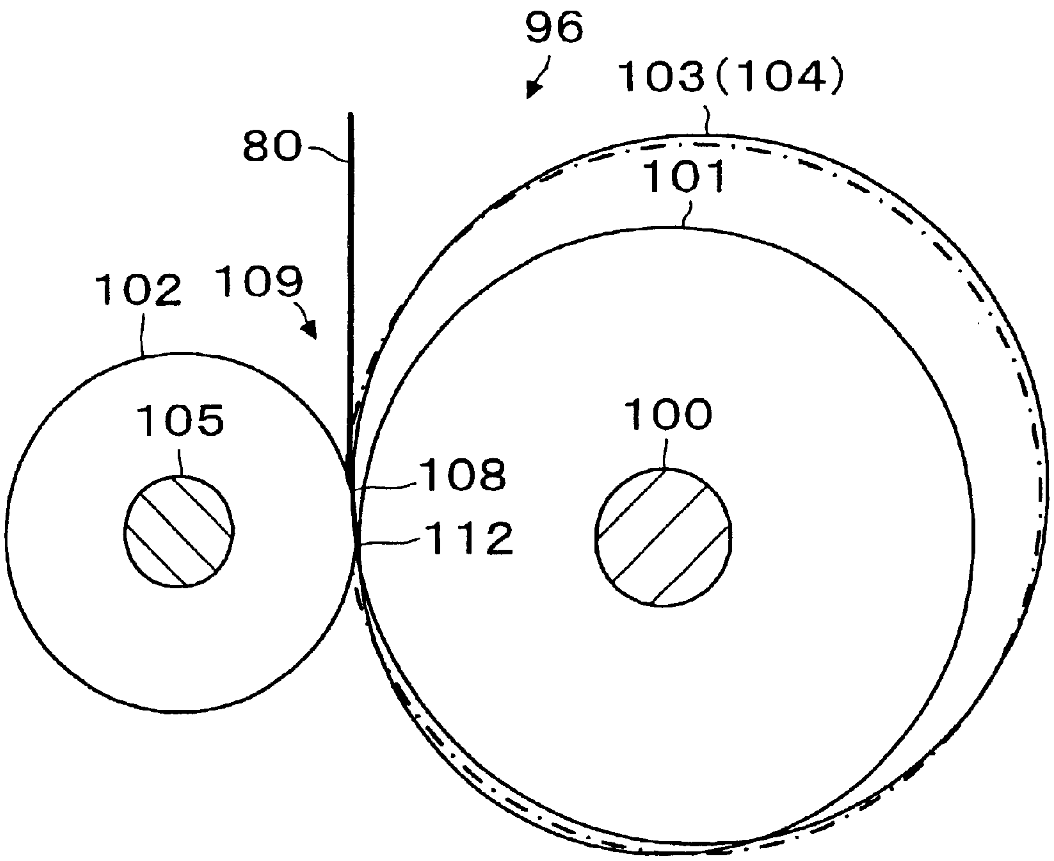
FIG. 5 is a schematic cross-sectional view of the rollers.

As shown in FIG. 4, the fixed rollers 103 and 104 are located at a 0.5 mm distance from the seventh pressing roller 102 and are eccentric to shaft 100. The roller 101 has contact with the seventh pressing roller 102 to provide a predetermined force. Transporting nip section 112 is located slightly below the overlap wedge section 108, as shown in FIG. 5. This structure is inexpensive to manufacture because the roller 101 also drives the seventh pressing roller 102 by friction.

The recycling banknotes 80 are transported from second arraying device 72, and are stopped by overlap sections 107. The shaft 100 is rotatable on a shaft bearing 113 and 114.

The shaft 100 is rotated through a one-way clutch 115 by a driving shaft 116.

The overlap section 108 can change its position, because the fixed rollers 103 and 104 pivot on a shaft (shown in FIG. 5). Therefore, the fixed rollers 103 and 104 are fixed by screws 110 and 111.

Next, the safe 2 is explained. Safe 2 has a storing section 117 which is located in the middle, a reject storing section 118 which is located in the upper section, a unit section 119 which is located under storing section 117, and a shutter section 120 which is located at one side. Lid 121 is hinged to a frame 122 by a key 123, and a storing section 117 can be opened or closed. The lid 121 is locked to safe 2 by key 123.

The reject storing section 118 is connected to a receiving slot 124 which has a rectangular configuration and is located at a horizontal extending section which is across from the nip section of reject transporting roller 74.

A banknote exit opening 125 is rectangular and is located below the shutter section 120 and the side of the nipped plane of first transporting roller 18. Banknote exit 125 passes through storing section 117.

The let off device 3 is explained by referring to FIG. 1. Let off device 3 is located in unit section 119 and includes rollers 126 and 127 which are located at a predetermined distance along a longitudinal direction of banknote B.

The physical surfaces of rollers 126 and 127 are located in banknote storing section 117. Pulleys (not shown) combined with a driven gear 128 and rotating rollers 126 and 127 through to belts 129. The driving device 17 drives driven gear 128. Banknote pusher 131 is located in storing section 117 and is moved towards rollers 126 and 127 by parallel link mechanism 132.

A handle 133 is supported at lid 121 for opening the lid to access the storing section 117.

The driving device of the first transporting roller 18 is explained. A first motor 134 drives the second roller 25 through a first transmission mechanism 135. The first transmission mechanism 135 includes a torque clutch. Therefore, the second roller 25 is driven at a predetermined torque by the first motor 134.

Next, the receiving unit 99 is explained. The receiving unit 99 includes a banknote lifter 151 and a drawing device 152. When the banknote lifter 151 lifts up the end of the lowest banknote B, a triangle space is formed between the bottom 157 and the lowest banknote B. Drawing device 152 includes rollers 126, 127, and idle gear 165.

The driver of a one by one dispensing device 96 and first transporting device 14 is now explained. First roller 21 is driven by second motor 162 through a second transmitting mechanism 163.

The first gear 22 rotates the driving shaft 116 through a gear train. Therefore, second motor 162 rotates roller 101 through a one way clutch 115.

Next, the driving device 17 of let off device 3 is explained. When the driving gear 164 rotates in the counterclockwise direction, idle gear 161 engages with the driven gear 128, therefore idle gear 165 does not engage with gear 128. As a result, the driven gear 128 rotates in the counterclockwise direction.

The rollers 126 and 127 rotate in the counterclockwise direction through belts 129 and 130. Therefore, the lowest banknote B is let off from receiving slot 19 by the rollers 126 and 127.

When the driving gear 164 rotates in the clockwise direction, the idle gear 165 engages with driven gear 128, therefore idle gear 161 does not engage with the driven gear 128. The driven gear 128 rotates in the clockwise direction shown in FIG. 1.

The rollers 126 and 127 rotate in the clockwise direction by the driven gear 128 through belts 129 and 130. The banknote B is drawn in safe 2 by rollers 126 and 127. As a result, the rollers 126 and 127 are let off device 3 or drawing device 152 which are changed on the rotating direction. Fourth motor 166 drives driving gear 164.

A driving device 170 of the package dispensing device 53 is explained. As shown in FIG. 1, the guiding roller 57 is rotated by a third motor 171.

The layout of the sensors to form a monitoring unit is explained referring to FIG. 1. Firstly, a banknote sensor is explained. First sensor 181 is located on the outside of shutter section 120. Second sensor 182 is located at receiving slot 19. Third sensor 183 is located at the first transporting passage 35. Fourth sensor 184 is located at the section of fourth roller 55. Fifth sensor 185 is located at the reject transporting roller 74. Sixth sensor 186 is located at banknote dispensing slot 5. Seventh sensor 187 is located at recycling passage 7.

The distance between the first sensor 181 and the third sensor 183 is the same length as a banknote B. The length sensor 188 includes the first sensor 181 and the third sensor 183. The second sensor 182 is a transparent photoelectric method sensor and has the function of a passing sensor and a duplicate sensor. Checking device 9 is the second sensor 182.

The banknote sensors can be changed to a reflecting type or a mechanical type and the type of sensor is not essential to the present invention.

The position sensor 193 is now explained. The position sensor 193 detects the first projection 61 and the second projection 62 in the tray 16.

Figure 6:
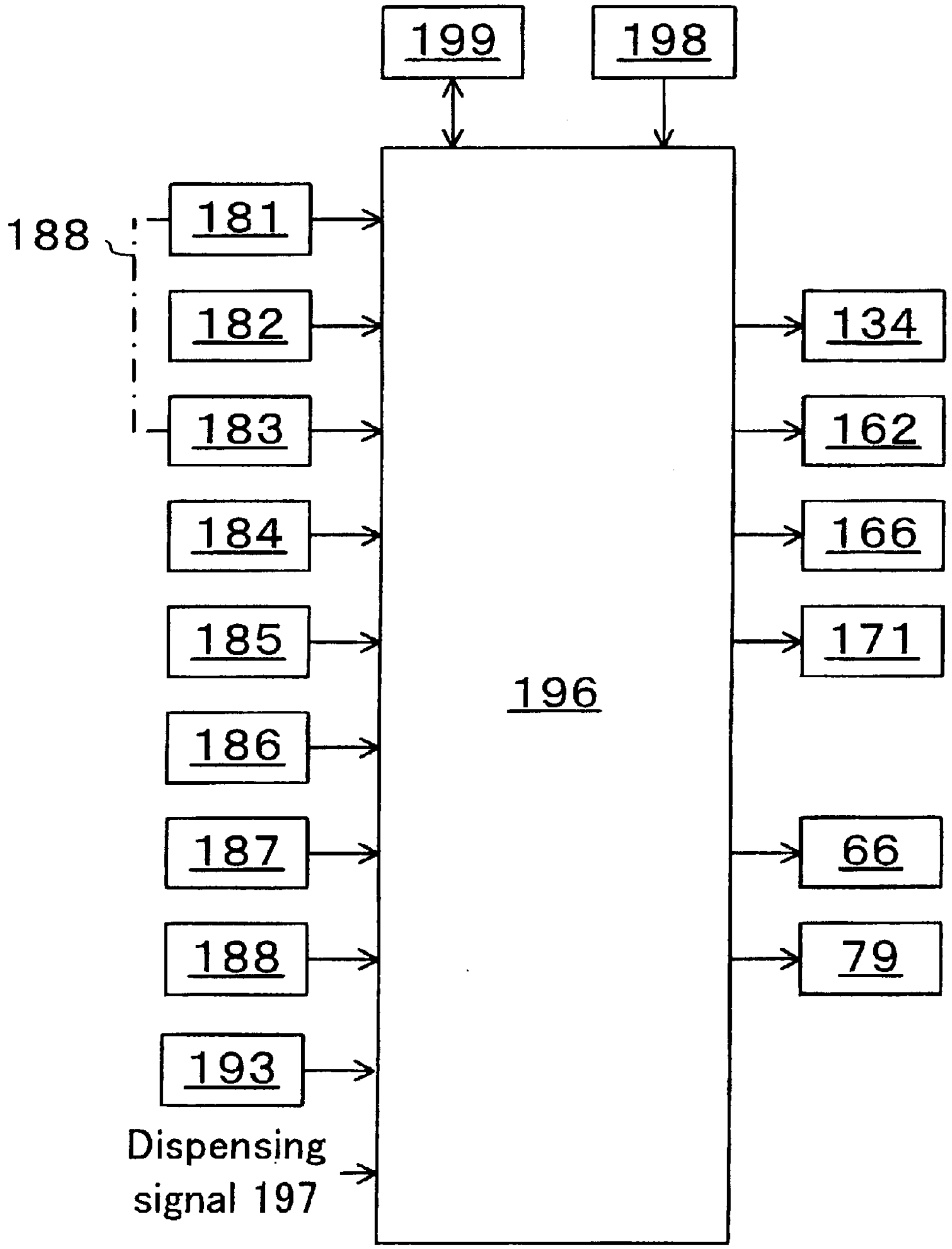
FIG. 6 is a schematic control diagram.
Figure 7:
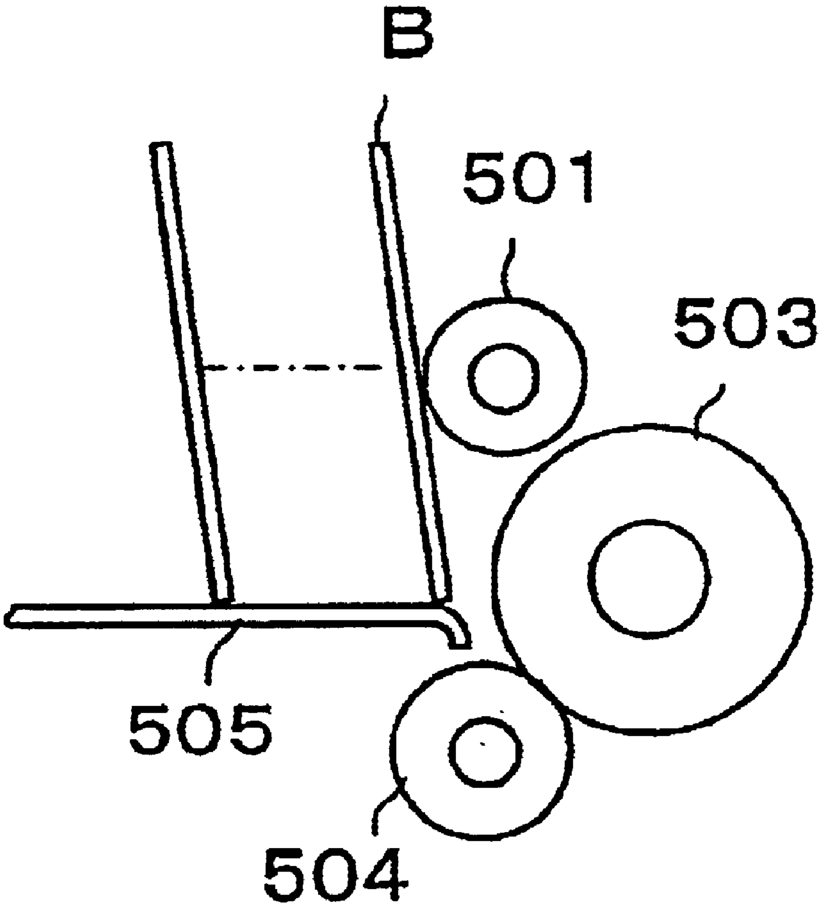
FIG. 7 is a schematic side view of a prior art dispenser roller arrangement.
Figure 8:
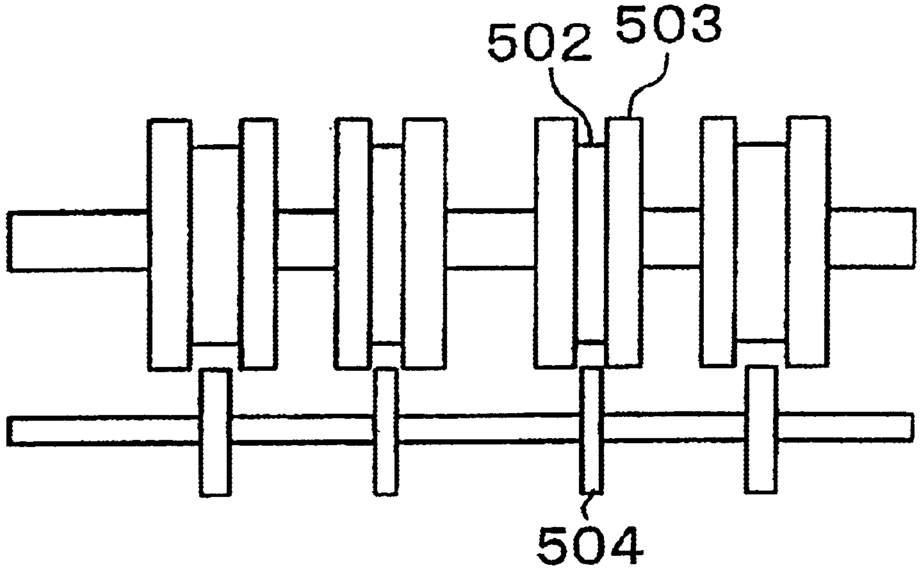
FIG. 8 is a front view of a prior art dispenser roller arrangement.

Next, the control block diagram is explained by referring to FIG. 6. The banknote sensors 181 through to 188 and position sensor 193 are connected to a microcomputer system 196. The dispensing signal 197 is input to microcomputer 196 to activate the machine.

The microcomputer 196 operates based on a program stored in ROM 198 and controls first motor 134, second motor 162, third motor 171, fourth motor 166, solenoid 66, and second solenoid 79. "199" is a RAM.

Next, the operation of the preferred embodiment is explained. At the situation, where the safe 2 is drawn from the storing section 11, a stack of banknotes B are then stored in storing section 117 by an operator. The lid 121 is closed and is locked by the key 123.

A banknote pusher 131 pushes the stack of banknotes B towards the bottom 157. The lowest banknote 8 has resting contact with the rollers 126 and 127. Safe 2 is inserted in storing section 11 and is locked to body 10 by a locking device (not shown).

Next the operation when a banknote B is paid out is explained. When dispensing signal 197 is outputted from the control circuit of a vending machine, the first motor 134 and the second motor 162 rotate.

When the first motor 134 rotates, the second roller 25 rotates in the clockwise direction through the first transmission mechanism 135 and the second gear 26. The first arraying roller (not shown), third roller 28, fourth roller 55, fifth roller 76, and second arraying roller 83 are rotated in the same direction by a gear transmission mechanism.

The first transporting roller 18, the first arraying roller, and fourth roller 55 rotates for banknote B to be let off to the storing device 16. The rejecting transporting roller 74 rotates for the let off of banknote B to reject storing section 118.

The second arraying roller 83 rotates for the recycled banknote 80 which is then transported to recycle storing device 73. The first gear 22 is rotated in the clockwise direction by the second motor 162 through the second transporting mechanism 163 shown in FIG. 1. Therefore, the first roller 21 rotates for the banknote B to the first transporting device 14.

Next, the fourth motor 166 rotates. The driving gear 164 is rotated in the counterclockwise direction as shown in FIG. 1 by the fourth motor 166. Therefore, the idle gear 161 engages with the driven gear 128 in unit section 119. Receiving the idle gear 165 does not engage with the driven gear 128.

The rollers 126 and 127 are rotated in the counterclockwise direction by the driven gear 128 through belts 129 and 130. The lowest banknote B is then sent to the banknote exit 125 by roller 126 and 127.

Only one banknote B passes through the banknote exit 125 and is transported to the receiving slot 19. The banknote B is transported to the first transporting passage 35 by the second transporting roller 23 through the first transporting roller 18 and it arrives to the first arraying device 36.

The banknote B is arrayed by the first arraying device 36 and it arrives at the third transporting roller 27. At the third transporting roller 27, the running direction of banknote B is changed to a right angle by the third press roller 29 and the fourth press roller 31.

Next, the second sensor 182 distinguishes any duplication of banknotes B. The output signal of the second sensor 182 which is a transmission type is compared to a predetermined standard level. When dispensed duplicate banknotes B are detected by the sensor, the program goes to a subroutine to specifically address this problem. When dispensed duplicate banknotes B are not detected, the program proceeds to the next step, and the length of the banknote B is judged to verify the banknote.

The distance between the first sensor 181 and the third sensor 183 is slightly longer than the length of banknote B. Therefore, if the first sensor 181 and the third sensor 183 output a detecting signal at the same time, it represents an abnormal situation and, as a result, the program goes to a second subroutine. If a normal situation is detected, the program goes to the next step.

The signal of the banknote B at the third sensor 183 is judged. In other words, when the dispensed banknote B from safe 2 is detected, the program goes to the next step. The fourth motor 166 is stopped and, as a result, the let off of the banknote 8 from safe 2 is stopped. When the banknote signal is detected over a predetermined time period, the program goes to a third subroutine, and an abnormal sign is displayed at the display, and all processes are stopped.

Next, the banknote-detecting signal of the fourth sensor 184 is distinguished. When the banknote detecting signal is none, it is a normal situation and the program goes to the next step.

If it is a genuine banknote, diverting board 65 is kept at the solid line position shown in FIG. 1. Therefore, the banknote B is guided to fourth roller 55 by the diverting board 65 while wedged between the fourth press roller 31 and the third roller 28. The forth roller 55 transports the banknote B to the storing device 16 which is located between the hollow 56 of tray 50 and the second transporting device 15.

Next, when counting the banknote signal which is outputted from the fourth sensor 184, the program goes to the next step. In other words, the banknotes B which are stored at a predetermined number in storing device 16 are checked to ensure the specific sum to be dispensed has accumulated in the tray 50. If the banknote signal is not at a predetermined number, the program loops to return to the step before. A second banknote B is dispensed from safe 2. This process is repeated until a predetermined numeral of banknotes has been dispensed from the safe.

Next, the first motor 134, the second motor 162, and the fourth motor 166 are stopped. As a result, the let off device 3, the first transporting roller 18, and the storing device 16 stop.

Next, the third motor 171 rotates. The guiding roller 57 is rotated in the counterclockwise direction as shown in FIG. 1. When the position sensor 193 detects second projection 62, the program goes to the next step. The third motor 171 stops, and the program goes to the next step.

When the position sensor 193 does not output a second detecting signal for the second projection 62 within a predetermined time, an emergency signal is released and stops the operation. If the proper signal is received, the banknotes B in the storing device 16 are moved to the banknote dispensing slot 5. As a result, the end of the banknotes 8 protrudes from the guiding board 63 and 64.

When the overlapping banknotes 8 are detected, solenoids 66 and second solenoid 79 are excited. The diverting board or diverting unit 65 slightly pivots in the clockwise direction by the solenoid 66 and closes the passage to the fourth roller 55 and opens the passage to the recycling passageway 7.

Also, the reject guiding board 78 slightly pivots in the clockwise direction by movement of the second solenoid 79 and closes the passage to reject transporting roller 74 and opens the passage to the recycling passageway 7.

Therefore, the banknote B is guided by the diverting board 65 and the reject guiding board 78 and goes to the second arraying device 72, while the banknote B is made into a wedged shape between the third roller 28 and the fourth press roller 31. Then the banknote B arrives at the second arraying device 72. The recycling banknote 80 is pushed to the reverse side 67 by the spring 98 at the second arraying device 72, afterwards it is pinched between the second arraying roller 83 and the reverse surface 67.

Hereupon, the recycling banknote 80 is wedged between the second arraying roller 83 and the reverse surface 67, and passes through and between the third roller 28 and the fourth press roller 31. The position of the recycling banknote 80 is changed by the second arraying roller 83. Therefore, the banknote 80 has its side 95 pushed to the third guiding wall 86 and is arrayed.

Therefore, the end of the recycling banknote 80 is stopped by the overlap section 108 which is located between fixed rollers 103 and 104 and seventh press roller 102. As a result, the recycling banknote 80 is stored in the recycle storing device 73. In this situation, the second arraying roller 83 has contact with the upper section of the recycling banknote 80. However, the second arraying roller 83 cannot be rotated because the friction clutch 94 slips.

Therefore, the recycling banknote 80 is not injured by the rotation of second arraying roller 83, because the transfer of torque of friction clutch 94 is controlled. Also, the banknote B does not become bunched up.

In this situation, the springs 87 push the upper section of the recycling banknote 80 to the first guiding board reverse side 67.

The recycling banknote 80 is transported to the recycle storing device 73 for storage, and the end of the next recycling banknote 80 is guided to the base of spring 87 by the slanting surface 97 of the spring 87.

The end of recycling banknote 80 is guided by the slant of spring 87 and has contact with the stored recycling banknote 80 from the side of safe 2. Therefore, the next recycling banknote 80 is pushed to the stored recycling banknote 80 by the end of spring 87.

The next recycling banknote 80 is arrayed by the second arraying roller 83 and the third guiding wall 86. In this manner, the recycling banknote 80 is arrayed at the safe 2 side.

Next, the storing process of recycling banknote 80 is explained. The banknote lifter 151 pushes up the top of the banknotes B in the banknote storing section 117. The banknote B and bottom 157 make up the receiving wedge space.

Next, the recycles banknote 80 are dispensed by the one by one dispensing device 96 when it is operated. Then second motor 162 and fourth motor 166 rotate in the reverse direction After that, the first roller 21 rotates in the counterclockwise direction by the second motor 162 through the second transporting mechanism 163 and the first gear 22.

The driving shaft 116 rotates in the counterclockwise direction through gears by the second motor 162 as shown in FIG. 4. Therefore, the diameter of the spring of one-way clutch 115 shrinks to have contact with driving shaft 116. As a result, the one-way clutch 115 lets in the clutch and rotates shaft 100 in the same direction. The roller 101 rotates in the counterclockwise direction by shaft 100 as shown in FIG. 5. The seventh press roller 102 has contact with roller 101 and rotates in the clockwise direction.

Therefore, only the recycling banknote 80 which has contact with the seventh press roller 102 is pulled down and is let off towards the side of the first transporting roller 18 by roller 101.

When the recycling banknotes 80 are not transported, the friction decreases between the seventh pressing roller 102 and the recycling banknote 80.

Therefore, the fixed rollers 103 and 104 are changed in their position as shown in FIG. 5, and the overlapping is increased. In this situation, the bent volume of the banknote B is increased, as a result, the friction between the recycling banknote 80 and the seventh pressing roller 102 increases.

When the rotating resistance of the seventh pressing roller 102 becomes more than the transferring force between the seventh pressing roller 102 and roller 101, the seventh pressing roller 102 does not rotate. Therefore, the banknote 80 is guided by the guiding board and goes to the contact section between the first roller 21 and the first press roller 20 and is transported to the banknote exit 125 from the receiving slot 19. The idle gear 161 is away from the driven gear 128, because the fourth motor 166 rotates in the opposite direction. The receiving idle gear 165 engages with the driven gear 128. Accordingly, the driven gear 128 rotates in a clockwise direction.

Consequently, the end of the recycling banknote 80, which is transported from the banknote exit 125 to the storing section 117 by the first transporting roller 18, goes between the roller 126, and the banknote B passes through the receiving section. The recycling banknote 80 is transported between the roller 126 and the banknote B is transported further away by the roller 127.

In this storing situation of the recycling banknote 80, when the second sensor 182 does not detect the recycling banknote 80, the second motor 162 and the fourth motor 166 stop the operation. Thus, the one by one dispensing device 96, the first transporting roller 18, and the drawing device 152 stop.

Therefore, the lifting device 151 releases the lifting, and as a result, the banknotes B come down. As a result, a cycle of the storing operation of the recycling banknote B finishes. When the sensor 187 detects the recycling banknote 80, the storing process is re-executed. When the sensor 187 does not detect the recycling banknote 80, the process of the recycling banknote finishes.

This present invention can be located at the banknote exit 125.

In this situation, when the banknote B is let off, the end of banknote B has contact with first roller 18 by rollers 126, 127 and goes to the overlap section 108. The transporting nip section 112 can be changed to a roller and a belt or a pair of belts which can have contact.

Also, in this present invention, the resistance guide can be changed to a circle disc and it can be rotated in the opposite direction from the banknote dispensing direction. The banknotes are transported one by one, because the resistance guide rotates in the opposite direction.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A dispensing device for storing banknotes in a storage unit and dispensing banknotes to a user through a discharge slot, comprising:

a transporting unit for transporting a banknote to be discharged along a first passageway to the discharge slot;

a monitor unit operatively positioned relative to the first passageway to monitor a condition of the transported banknote;

a diverting unit operatively connected to the monitor unit to remove a banknote from the first passageway when the monitor unit indicates duplicate banknotes;

an arraying device operatively connected to the diverting unit for aligning the banknotes, and a sorting device operatively connected to the diverting unit, the sorting device includes a resistance guide unit which initially contacts the duplicate banknotes and a rotatable driving roller that can subsequently contact the duplicate banknotes to provide a separation of the duplicate banknotes.

2. The dispensing device of claim 1, wherein the surfaces of the resistance guide unit and the rotatable driving roller form, in a side cross-section to the rotational axis of the rotatable driving roller, a wedge-shape receiving section for the banknotes, and a banknote nipping section is located downstream of the wedge-shape receiving section.

3. The dispensing device of claim 2 further including a second roller contacting the rotatable driving roller for forming the nipping section.

4. The dispensing device of claim 2, wherein the resistance guide unit includes a pair of fixed curved surface members positioned on either side of the rotatable driving roller and having a larger diameter than the rotatable driving roller.

5. The dispensing device of claim 4 further including an adjuster unit for changing the position of the pair of fixed curved surfaced members.

6. The dispensing device of claim 3 further including a drive source for driving the second roller.

7. The dispensing device of claim 6, wherein the rotatable driving roller has a higher friction surface than the second roller.

8. The dispensing device of claim 1, wherein the resistance guide unit is eccentrically mounted relative to the rotatable driving roller.

9. The dispensing device of claim 1, wherein the arraying device includes biasing members for forcing a banknote in a specific direction and a rotating drive roller with a side slanting surface for aligning a banknote.

10. The dispensing device of claim 9, wherein the arraying device further includes a friction clutch and a power source for driving the rotating drive roller through the friction clutch.

11. The dispensing device of claim 9, wherein the rotating drive roller is made front a flexible material to deform during operation.

12. The sorting device of claim 1, wherein the resistance guide unit includes two fixed curved surface members, positioned to be located respectively to sandwich the rotatable driving roller.

13. The sorting device of claim 12, wherein the rotatable driving roller has a higher friction surface titan the two fixed curved surface members.

14. The sorting device of claim 13 further including a second rotatable roller whose surface is in contact with the rotatable driving roller to form a nipping section downstream of the initial banknote contact with the resistance guide unit.

15. The sorting device of claim 14, wherein the resistance guide unit is eccentrically mounted relative to the rotatable driving roller.

16. The sorting device of claim 14, wherein the resistance guide unit includes a pair of circular rollers.

* * * * *